Figure 1:
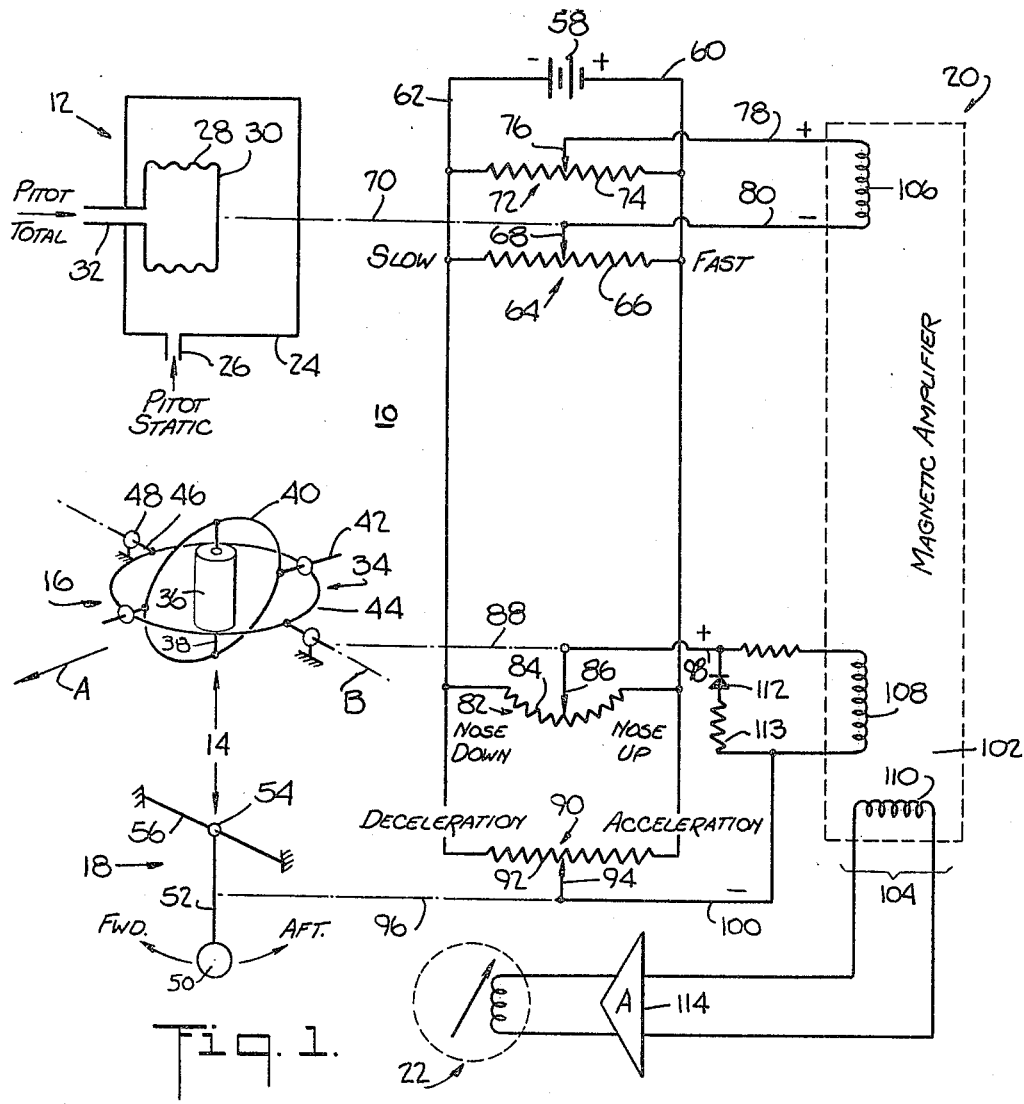

Nov. 15, 1966     L. M. GREENE     3,285,067
AIRPLANE INSTRUMENT FOR FURNISHING A DECELERATION-MODIFIED
DIRECTOR SIGNAL TO INDICATE OR CONTROL CORRECTIVE
ACTION FOR OFFSETTING DECREASE IN HEAD WIND
DURING LANDING APPROACH
Filed Oct. 16, 1963

INVENTOR.
LEONARD M. GREENE
BY
ATTORNEYS and United States Patent Office

3,285,067
Patented Nov. 15, 1966

3,285,067
AIRPLANE INSTRUMENT FOR FURNISHING A DECELERATION-MODIFIED DIRECTOR SIGNAL TO INDICATE OR CONTROL CORRECTIVE ACTION FOR OFFSETTING DECREASE IN HEAD WIND DURING LANDING APPROACH
Leonard M. Greene, Chappaqua, N.Y., assignor to Safe Flight Instrument Corporation, White Plains, N.Y., a corporation of New York
Filed Oct. 16, 1963, Ser. No. 316,759
10 Claims. (Cl. 73—178)

This invention relates to an airplane instrument for furnishing a deceleration-modified director signal to indicate or control corrective action for offsetting decrease in head wind during landing approach.

In making a landing approach it is customary for a pilot to fly the airplane so that it heads into the prevailing wind whereby to secure a minimum ground speed when the airplane touches down. Such prevailing wind is customarily referred to as "head wind." Movement of any fluid is affected by stationary objects in or adjacent its path of flow. These generate boundary friction and turbulence that reduce the speed of movement. Thus, movement of air is affected by the ground. The presence of the stationary ground mass diminishes head wind, the reduction being a function of the proximity of the ground to the point at which the wind speed is measured. At the range of altitudes for an airplane during landing approach the diminishing of the head wind, a condition conventionally referred to as "wind shear," can be quite substantial. If an airplane descends toward a landing at a constant true ground speed, that is to say, if no inertial acceleration is taking place, and if the airplane encounters a reduced head wind due to the higher wind speed aloft and the lower wind speed near the ground, the airplane obviously will experience a reduction in its air speed. In other words, although its true ground speed is constant, since the head wind is diminishing, its true air speed is lessened. Such reduced air speed lowers the lift and easily may result in an unsafe flight condition. Thus, during a landing approach, because the pilot wants a minimum touchdown ground speed, the airplane already may be flying at close to the slowest air speed needed to sustain the airplane in flight. Additionally, the airplane, in order to obtain maximum lift utilization for the given slow air speed, may be flying at a high angle of attack that is near stall. The reduced air speed brought about by wind shear may thus require an unsafe increase in angle of attack in order to supply sufficient lift for the airplane or it will reduce the air speed to a point where it is insufficient to maintain stable flight.

The reduction in air speed can be observed both in the reading of an air speed sensing means and the reading of a lift sensing means, the latter reading being evidenced in sundry fashions, for example, by a variation in angle of attack or a variation in the position of the shifting stagnation point on the nose of the airplane wing. Hence, by sensing a change of air speed or of lift and by generating a director signal in response thereto, the pilot manually, or through an automatic means, automatically, will increase power (and hence air speed) or decrease angle of attack (so as to increase air speed). Preferably, because the airplane during landing approach is flying at a condition of low power and may be close to touchdown, power is increased.

However, a director signal that is responsive solely to an air speed or lift sensing means is not enough for good control since another variable is present the change in which over a short span of time will affect air speed and lift. I refer, specifically, to forward acceleration. The presence of or a change in forward acceleration heralds an ensuing change in air speed or lift; that is, if forward acceleration exists at any given time, it shortly will be translated, by airplane dynamics, to a change in air speed or lift. For evenness of flight (minimization of phugoid hunting for equilibrium) and for safety, it is most desirable that the air speed or lift signal be modified by a forward acceleration signal that when added to the air speed or lift signal will provide a composite signal that is a present indication of what the air speed or lift will be in the immediate (a few seconds) future by which time the acceleration will be converted into a change in air speed or lift.

Two concrete examples of situations which give rise to forward acceleration will demonstrate the need for taking such variable into account. During landing approach a pilot usually will decrease power, either uniformly or in a series of negative increments. The immediate effect of the decrease on air speed is nil due to the momentum of the airplane; but the short time effect is to decrease air speed or lift. Such short time effect should be included in the director signal since the signal then (taking the short time effect into account) may be such as to indicate that the air speed soon will be too low and should be raised immediately. A second example is the sudden malfunctioning or stoppage of an engine during landing approach. Again, there is no immediate effect on air speed. However, the acceleration-modified signal will through the pilot or an automatic means (e.g., an automatic pilot controlling the throttle) increase power or decrease angle of attack so as to compensate in advance for the loss of air speed or lift that soon will take place.

As a practical matter forward acceleration is best sensed (measured) by inertial means, e.g., a pendulum or a spring-centered linearly translatable mass. But a particular difficulty is attendant upon the use of inertial means for the specific purpose above discussed. In order to explain this difficulty certain nomenclature will have to be adopted to avoid semantic confusion. "Forward inertial acceleration" will be used herein as a generic term denoting acceleration in both a positive and a negative sense in a direction parallel to the longitudinal axis (nose-to-tail) of an airplane. "Forward inertial deceleration" will be used herein to denote only negative forward inertial deceleration.

The aforesaid difficulty with using forward inertial acceleration sensing means turns about the train of events consequent upon encountering wind shear. The initial action is for the air speed or lift sensing means to command or cause an increase in power to offset the decrease in head wind. But as soon as this occurs the inertial forward acceleration sensing means would command or cause a curtailment of the power increase. This is most undesirable because, as noted previously, the airplane during landing approach is operating in a critical area and the increase in power is needed in its full required degree at once, regardless of short term effects.

Accordingly, it is an object of my invention to provide an airplane instrument for landing approach in which an air speed or lift signal is modified to take into account forward inertial deceleration and not to be affected to a substantial degree by positive forward inertial acceleration.

It is another object of my invention to provide an airplane instrument for landing approach in which an air speed or lift signal is modified by a forward inertial acceleration signal and further in which the positive sense of such acceleration signal is substantially blocked.

It is another object of my invention to provide an airplane instrument for landing approach in which an air speed or lift signal is modified by substantially only the negative sense of a forward inertial acceleration signal, i.e., wherein the forward inertial acceleration modification constitutes substantially only forward inertial deceleration.

It is another object of my invention to provide an airplane instrument which furnishes an output usable as a director signal which output is a function of air speed or lift as modified substantially only by the negative aspect of forward inertial acceleration.

It is another object of my invention to provide an airplane instrument which furnishes a director signal that essentially comprises a combination of air speed or lift with forward inertial deceleration to the substantial exclusion of positive forward inertial acceleration.

Other objects of my invention in part will be obvious and in part will be pointed out hereinafter.

My invention accordingly consists in the features of construction, combination of elements and arrangement of parts which will be exemplified in the instruments hereinafter described and of which the scope of application will be indicated in the appended claims.

Figure 2:
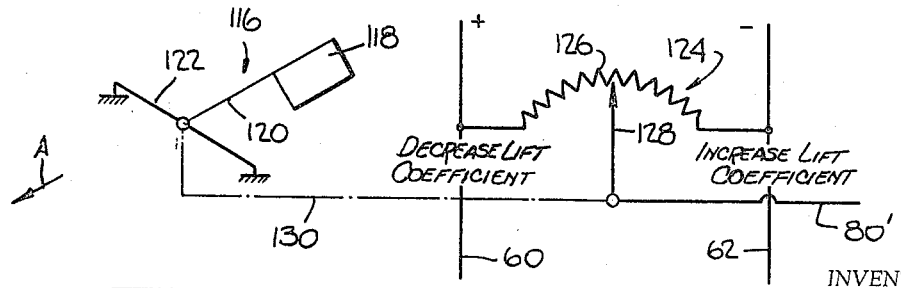

In the accompanying drawings in which are shown various possible embodiments of my invention, FIG. 1 is a schematic and circuit diagram of an airplane instrument embodying my invention; and FIG. 2 is a schematic view of a lift sensing means and transducer employed in a modified form of my invention.

An airplane instrument embodying my invention basically includes means having an output which varies as a function of indicated air speed or as a function of lift, and means to modify said output as a function of negative forward inertial acceleration, i.e., as a function of forward inertial deceleration to the substantial exclusion of positive forward inertial acceleration.

In its preferred form an airplane instrument of the instant invention constitutes a first means having an output which varies as a function of indicated air speed, a second means having an output which varies as a function of forward inertial acceleration, said second means including means to substantially curtail an output which corresponds to a positive forward inertial acceleration, said second means being so arranged that an increase in forward deceleration produces a slow output signal, i.e., one indicating a decrease in air speed, and means to combine the two outputs to provide an air speed director signal. Preferably, the instrument further includes a utilization mechanism such as an indicator or an automatic control for the throttle or elevators of the airplane.

The means having an output which varies as a function of indicated air speed desirably is a dynamic indicated air speed sensing means, that is to say, a means which senses the forward dynamic pressure on the airplane as by sensing the total pitot pressure in a forward direction and subtracting the prevailing static pressure.

The means having an output which varies as a function of lift, and which may be substituted for the means having an output which varies as a function of indicated air speed, may take various forms. Essentially, said means furnishes an output which is responsive to the prevailing lift. Either the wing lift coefficient or the angle of attack furnish a lift value for an airplane, such for instance, as the lift ratio, this being a fraction of which the numerator is the prevailing lift and the denominator is the maximum lift available, that is to say, the total lift that would be available if the attitude of the airplane was changed to a point just approaching stall. All of these terms, e.g., lift coefficient, angle of attack and lift ratio will be generically and jointly referred to herein as the "lift" of the airplane. Accordingly, the lift responsive means may constitute a means for measuring the angle of attack or a means that is responsive to the position of the shifting stagnation point on the nose of the airplane wing.

The means having an output which varies as a function of forward inertial acceleration desirably is a vertical gyro-referenced pendulum, that is to say, a pendulum which turns about a lateral axis and which is referenced to a vertical gyro. The referencing may be accomplished in any one of various manners, for instance, by having the pendulum operate the wiper or control shaft of a potentiometer the resistance winding or frame of which is held stationary when the frame of the airplane pitches by means of a vertically spinning gyro having its pitch gimbal connected to said resistance winding or frame of the potentiometer. Alternatively, the referencing may be accomplished by determining the difference between the voltage outputs from two potentiometers one of which has its control shaft connected to the pendulum and the other of which has its control shaft connected to the pitch gimbal of the vertically spinning gyro, the resistance windings or frames of both potentiometers being secured to the frame of the airplane. As a further alternative, the referencing may be accomplished by having two wipers ride on a single potentiometer resistance winding that is secured to the airplane frame, one wiper being controlled by the pendulum and the other wiper being controlled by the horizontal (pitch) gimbal of the vertically spinning gyro. In all of these arrangements the net output represents the difference between the pendulum position which is a function of both pitch angle and forward inertial acceleration, and the relative position of the gyro horizontal gimbal and the airplane frame which is a function of pitch angle, such net output thereby being a function of forward inertial acceleration unmingled with pitch angle.

The means to substantially curtail an acceleration output corresponding to positive forward inertial acceleration may constitute a unidirectional device which is operative to create an output when the pendulum moves forward to an extent greater than called for by the pitch angle of the airplane and which will minimize or block any output when the pendulum moves aft to an extent greater than that called for by the pitch angle of the airplane. Where the outputs are electrical the unidirectional device conveniently comprises a rectifier.

The means for combining the various outputs can either be mechanical or electrical in nature depending upon the outputs. For example, differential transmissions can be used when the outputs are mechanical, and summing means such as plural input magnetic amplifiers or Wheatstone bridges can be used when the outputs are electrical. I prefer to employ electrical outputs for the sundry means since these are easier to handle and adjust and, accordingly, each of the means having an output desirably includes a transducer to change a mechanical positional output into an electrical output.

Referring now in detail to the drawings, the reference numeral 10 denotes an airplane instrument constructed in accordance with my present invention. The line of flight of the airplane in which the instrument is carried is indicated by the reference character A. This is the line of flight of the airplane with respect to its local air mass.

The instrument includes an air speed sensing means 12 and a forward inertial acceleration sensing means 14. The latter includes a pitch angle sensing means 16 in the form of a vertically spinning gyro, and a pendulum 18 which senses both pitch angle and forward inertial acceleration. The difference between the pendulum angle and the pitch angle is a measure of forward inertial acceleration independent of pitch angle. The outputs of the air speed sensing means, the vertical gyro position and the pendulum position are mechanical. The instrument further includes transducers for converting the sundry mechanical outputs into electrical outputs. The difference between the vertical gyro position output and pendulum position output constitutes the electrical output for the forward inertial acceleration sensing means. The difference output is polar and is applied across a rectifier or the like which is so arranged that when the output is in a sense corresponding to a positive forward inertial acceleration the rectifier provides a low resistance shunt path which diverts the output, thereby to substantially curtail or block the same. However, when the output is in a sense corresponding to a forward inertial deceleration the rectifier provides a high resistance shunt path which does not noticeably affect the output of the forward inertial accelerating means. Finally, the instrument includes a summing means 20, i.e., a combining means for adding the two electrical outputs, the summing means feeding the output to a utilization mechanism 22.

It should be mentioned that the sundry means above described may constitute elements of other instruments, as, for example, the instrument shown in my copending application for "Airplane Instrument Furnishing a Condition-Modified Air Speed Director Signal," Serial No. 304,915, filed August 27, 1963, which elements are interconnected in a circuit such as will shortly be described for use during a landing approach and which elements when so connected will function in the manner and for the purpose heretofore generalized.

The air speed sensing means 12 is, as indicated earlier, of the dynamic pressure type. It includes a case 24 provided with a single opening 26 that connects the interior of the case to the pitot static pressure. Also located within the case is a corrugated bellows 28 having a wall 30 which is shiftable as a function of the difference in pressures between the interior of the bellows and the interior of the case 24. A conduit 32 extends from the bellows through a wall of the case to which it is tightly sealed to a forwardly facing Pitot tube external to the airplane and sufficiently far from the airplane, wing, propellers, jet engines and fuselage structure to be materially unaffected by turbulence created by the airplaine. Thereby, the air pressure within the bellows is the total pitot pressure including the static pressure that is a function of altitude and air conditions and the dynamic pressure that is a function of indicated air speed. Hence the wall 30 of the bellows will experience movement which is a function of dynamic air pressure and, therefore, a function of indicated air speed.

The pitch angle sensing means 16 constitutes a vertically spinning gyro 34 which has a spinning weight 36 secured to a vertical weight shaft 38. The ends of the weight shaft are journaled in bearings in a vertical gimbal ring 40 that lies in a vertical plane parallel to the fore and aft axis of the airplane and generally parallel to the line of flight A. The gimbal ring 40 is provided with trunnions 42 journaled to turn on a roll axis parallel to the line of flight A in bearings carried by a horizontal (pitch) gimbal ring 44, the trunnions and bearings being located in a fore and aft line in the plane of the gimbal ring 40. The horizontal gimbal ring 44 is journaled by horizontal trunnions 46 that constitute the pitch axis B on a structural member of the airplane, for example, bearings 48 fixed to the airplane frame. The pitch axis B is at right angles to the line of flight A and to the roll axis.

The spinning weight 36 is rotated at high speed by any suitable means, e.g., an air motor or an electric motor of conventional construction.

As is well known, in an arrangement of this character the horizontal gimbal ring 44 and the trunnions 46 constituting the pitch axis B will remain fixed within the airplane with said gimbal ring horizontal when the airplane experiences pitching movement, i.e., changes its pitch angle. Thus, when the airplane rotates in space so as to raise or lower the angle of its nose, the horizontal gimbal ring 44 will not experience a corresponding angular movement above the pitch axis B, but will remain fixed in a plane parallel to the ground. Thus, the angular relationship between the horizontal gimbal ring 44 and the frame of the airplane will vary as a function of the pitch angle of the airplane.

The pendulum 18 is in the form of a pendulum bob 50 secured to an arm 52 that is journaled at 54 to a shaft 56 which is fast on the airplane frame. Said shaft and journal are so disposed that the pendulum bob swings about a lateral axis, this being an axis perpendicular to the line of flight A and horizontal when the airplane is horizontal. The angular position of the pendulum bob with respect to the airplane frame varies as a function of forward inertial acceleration and pitch angle and the difference between such angular position of the bob and the relative angular position between the horizontal gimbal ring 44 and the airplane frame is a function of forward inertial acceleration unmingled with pitch angle.

The transducers for the various sensing means are energized from a source of electric power such as a battery 58 through a pair of buses 60, 62, the bus 60 being shown as positive and the bus 62 being shown as negative.

The transducer for the air speed sensing means includes a potentiometer 64 having a resistance winding 66 and a wiper 68. The winding 66 is fast to the frame of the airplane and has its opposite ends connected to the buses 60, 62. The wiper 68 is connected by a mechanical link 70 to the bellows wall 30, so that its position on the resistance winding and, therefore, the value of the voltage picked off by it will be a function of dynamic indicated air speed.

Although it is within the scope of my invention to feed such an electrical output which is a function of the numerical value of the dynamic indicated air speed into the summing means 20, I prefer to employ an output which is an indication of a null reading, this being the difference between the indicated air speed and a preselected air speed, so that the net output from the transducer for the air speed sensing means is an output indicative of the deviation of the dynamic indicated air speed from a preselected air speed. This has the advantage of enabling the pilot, human or mechanical, to observe as an air speed director signal an indication that the air speed is above or below a preselected null.

In order to derive such a null signal, I provide a null potentiometer 72 for the air speed sensing means. The null potentiometer includes a resistance winding 74 and a wiper 76. The resistance winding is fast to the frame of the airplane and is connected across the buses 60, 62. The wiper 76 is adjusted manually to any selected air speed, whereby the difference between the voltage pick offs from the two potentiometers 64, 72 is a null output which is a function of the deviation of indicated air speed from a preselected air speed.

As indicated by legends in the figure, the null air speed output will be more positive on the wiper 68 than on the wiper 76 when the measured dynamic air speed is faster than the preselected air speed, and will be more negative when the measured dynamic air speed is slower than the preselected air speed. Phrased differently, a more negative output on the wiper 68 than on the wiper 76 is an indication that the airplane's air speed is too slow with reference to a preselected null air speed. The output from said air speed null transducer appears across lead wires 78, 80 connected, respectively, to the wipers 76, 68.

The transducer for the pitch angle sensing means 16 includes a potentiometer 82 having a resistance winding 84 and a wiper 86. The winding 84 is fast to the frame of the airplane and has its opposite ends connected to the buses 60, 62. The wiper 86 is connected by an arm 88 to the horizontal (pitch) gimbal ring 44 of the vertically spinning gyro 34 so that its position on the resistance winding and, therefore, the value of the voltage picked off by it will be a function of the pitch angle of the airplane.

The transducer for the pendulum 18 includes a potentiometer 90 having a resistance winding 92 and a wiper 94. The winding 92 is fast to the frame of the airplane and is connected across the buses 60, 62. The wiper 94 is connected by a mechanical link 96 to the arm 52 of the pendulum bob 50 so that the position of said wiper on the resistance winding and, therefore, the value of the voltage picked off by it, will be a function of the position of the bob 50. The position of said bob is, as was noted heretofore, controlled by two variables. One of these is forward inertial acceleration (positive or negative) and the other is pitch angle. Hence, the value of the voltage picked off by the wiper 94 is a function of both forward inertial acceleration and pitch angle.

The output from the pitch angle wiper 86 appears on a lead wire 98 and the output from the pendulum 18 appears on a lead wire 100. These two outputs are opposed to one another, so that the net output therefrom has the pitch angle component cancelled out, i.e., absent, whereby the net output is a function only of forward inertial acceleration. Thus, if the nose of the airplane rises, the output on the lead wire 98 becomes more positive and at the same time the output on the lead wire 100 becomes more positive by a like amount; this assumes that there is present neither negative nor positive forward inertial acceleration. Thus, the net difference between the outputs on the lead wires 98, 100 will be zero for changes in pitch angle. However, if at any given pitch angle forward inertial acceleration is sensed by the pendulum, the difference signal between the voltages on the two lead wires 98, 100 will be a measure of the value of such forward acceleration. The lead wire 100 will be more positive than the lead wire 98 when positive forward acceleration is present and the lead wire 100 will be more negative than the lead wire 98 when negative forward acceleration, i.e., deceleration, is present.

The summing means 20 is of any electrical arrangement which will add the various outputs from the two transducers, the output from the first transducer (indicated air speed) appearing across the lead wires 78, 80, and the output from the second transducer (forward inertial acceleration) appearing across the lead wires 98, 100. A suitable summing means is a reset magnetic amplifier 102. Typical amplifiers of this type are the Ferrac Magnetic Amplifiers manufactured by Airpax Electronics, Seminole Division of Fort Lauderdale, Florida. This type of amplifier includes a plurality of control inputs and a polar output 104. A highly simplified internal diagram for the amplifier has been schematically indicated for ease in following the explanation of the operation of the instrument 10. I have shown only two input control windings 106, 108 and one output winding 110.

The input control winding 106 is connected across the lead wires 78, 80 and hence provides a control input which is a function of the deviation of the dynamic indicated air speed from the preselected manual null air speed setting of the wiper 76.

The input control winding 108 is connected across the lead wires 98, 100 and hence provides a control input which is a function of the forward inertial acceleration being experienced by the airplane in which the instrument 10 is mounted. However, pursuant to the present invention, the output of the forward inertial acceleration sensing means 14 is specially handled so as to curtail or substantially eliminate any output which is a function of forward inertial acceleration in a positive sense, while at the same time not affecting any output which is a function of forward inertial acceleration in a negative sense (deceleration). This special effect is obtained by connecting a rectifier 112 in series with a resistor 113 across the two lead wires 98, 100. The rectifier, as is conventional, presents a high impedance path in one direction and a low impedance path in the opposite direction. The rectifier is so connected that it in conjunction with the resistor 113 provides a lower impedance path between the lead wires 98, 100 when the lead wire 100, and hence the output from the potentiometer 90, is more positive than the lead wire 98 and hence the output from the potentiometer 82. Thus, this lower impedance path is provided when the pendulum bob is further aft than is called for by the pitch angle of the airplane, as indicated by the gyro 34. Such lower impedance path shunts the control input winding 108 and, accordingly, substantially curtails any input into the magnetic amplifier (summing means) at this input. It will be appreciated that the output from the forward inertial acceleration means 14 is thus dissipated in the rectifier when such output is in a sense to indicate a positive forward inertial acceleration.

However, when the output from the forward inertial acceleration means 14 is such that the lead wire 100 is more negative than the lead wire 98, thus giving an indication of forward inertial deceleration, the rectifier 112 provides a high impedance path to the reverse flow of current therethrough. Thereby, substantially the total output from the forward inertial acceleration means 14 is at such time applied to the input control winding 108. It will be appreciated that by the use of the rectifier 112, oriented in the manner described, I feed to the magnetic amplifier a signal which is responsive to forward inertial deceleration, but no signal in response to positive forward inertial acceleration.

The output developed on the winding 110 is a function of the sum of all the signals (positive and negative) fed into the input control windings 106, 108.

It will be observed that the air speed sensing transducer is so connected that at a dynamic indicated air speed which is slower than the null air speed, as determined by the manual setting of the wiper 76, a positive signal appears on the lead wire 78 and a negative signal on the lead wire 80. That is to say, the lead wire 80 is negative with respect to the lead wire 78 at such time. These values have been indicated by plus and minus symbols at the terminals to the input control winding 106. Phrased differently, when the potentials applied to the control winding 106 are as denoted by said symbols, it is an indication that the airplane's air speed is too slow. If this were the only signal being fed into the summing means 20, the signal appearing at the polar output 104 would indicate that the airplane's air speed is too slow.

The connections from the forward inertial acceleration sensing means to the control winding 108 are such that for a condition of inertial deceleration the lead wire 100 is more negative than the lead wire 98, so that the signal supplied to the summing means is such as to indicate that the airplane speed is too slow. If this were the only signal being fed into the summing means 20 (if the indicated air speed were the same as the preselected air speed), the signal at the polar output 104 would indicate that the airplane's speed is too slow. The values which are indicative of the presence of inertial deceleration are shown by plus and minus symbols at the terminals to the input control winding 108.

To summarize, as to the connections of the two input control windings, the plus and minus symbols at the terminals of said windings show the polarity of the inputs toward producing a slow output signal.

The polar output 104 is connected through an amplifier 114 to the utilization mechanism 22 which may be a null meter or the input control terminals of an autopilot. The autopilot may be arranged, for example, to operate either the elevators or the throttle of an airplane. For instance, if the combined output 104 indicates that the airplane's speed is too slow, the autopilot will increase the throttle setting or decrease the pitch angle of the airplane.

The operation of the instrument is believed to be obvious. The output signal 104 fed to the utilization mechanism indicates that the airplane's speed is too fast when such speed is above the null value and too slow when such speed is below the null value, assuming the forward inertial acceleration input is zero.

When the forward inertial acceleration indicates the presence of positive forward acceleration, there is little or no effect on the output signal 104, since the acceleration signal will be substantially or wholly dissipated in the rectifier 112. When forward deceleration is present, the signal fed to the input 108 will indicate that the airplane's speed is to slow (assuming the true air speed to be equal to the preselected air speed) and the human or automatic pilot will take suitable steps to increase the speed.

It will be appreciated that with an instrument such as described, if the indicated air speed falls off during landing approach, as it will due to wind shear, and if the pilot has not precompensated for this, the signal on the utilization mechanism will indicate that the air speed is too slow and this signal will not indicate predicted restoration to the proper air speed in the near future simply upon the occurrence of positive forward acceleration. The signal will indicate a sufficient air speed only when the airplane's true air speed has reached the preselected value. But, if when this instrument is functioning during a landing approach, forward deceleration should take place, the director signal will, even if the existing air speed is correct, indicate by prediction too slow an air speed and thereby cause appropriate steps to be taken to accelerate the airplane so as to compensate in advance for the imminent loss of air speed.

The advantage of using inertial accelerometers rather than air-mass sensed acceleration is that the inertial sensing means is less affected by the turbulence of the air and by vagaries of movement of the air mass. The use of the decelerometer above described may well be accompanied by an additional positive forward acceleration air-mass sensing means the output from which may be treated to eliminate short term variations so as to smooth out the unsteadiness of the signal and the output of said last-named means in such event will be summed with the other outputs.

As indicated previously, instead of supplying a signal which is a function of indicated air speed, I may in lieu thereof supply a signal which is a function of lift and in FIGURE 2 I have shown a means 116 sensitive to lift of the airplane. Any suitable type of lift sensing means can be employed for this purpose, as for instance, a means that will measure the position of the shifting stagnation point on the nose of an airplane wing, or a means for measuring the angle of attack. Said lift sensing means has associated therewith a transducer for translating the response of the sensing means into an appropriate variable electrical value, e.g., a voltage that can be fed to the input coil 106 in lieu of the voltage fed from the potentiometer 64. As shown herein, the means 116 constitutes an angle of attack vane 118 fixed to an arm 120 that turns about a lateral shaft 122, i.e., a shaft perpendicular to the line of flight A and horizontal when the airplane is horizontal.

The vane 118 controls a lift potentiometer 124 including a resistance winding 126 fixed to the frame of the airplane and a wiper 128 which rides on the winding 126. The wiper is connected by a mechanical linkage 130 to the arm 120. The opposite ends of the resistance winding 144 are connected to the busses 60, 62. A lead wire 80' is connected to the wiper 128.

When the lift sensing means 116 is employed, it takes the place of the dynamic air speed sensing means 12 and its potentiometer 124 takes the place of the potentiometer 64. The lead wire 80' replaces the lead wire 80 and is connected to the lower end of the input winding 106.

It thus will be seen that I have provided devices which achieve the several objects of my invention and which are well adapted to meet the conditions of practical use.

As various possible embodiments might be made of the above invention and as various changes might be made in the embodiments above set forth, it is to be understood that all matter herein described or shown in the accompanying drawings is to be interpreted as illustrative and not in a limiting sense.

Having thus described my invention, I claim as new and desire to secure by Letters Patent:

1. An airplane instrument for furnishing a director signal to indicate or control corrective action for offsetting decrease in head wind during landing approach, said instrument comprising means having an output which varies as a function of the indicated air speed of an airplane, and means to modify said output as a function of the forward inertial deceleration of the airplane to the substantial exclusion of positive forward inertial acceleration.

2. An airplane instrument for furnishing a director signal to indicate or control corrective action for offsetting decrease in head wind during landing approach, said instrument comprising means having an output which varies as a function of the indicated air speed of an airplane, and means to modify said output as a function of the negative aspect only of the forward acceleration of the airplane.

3. An airplane instrument for furnishing a director signal to indicate or control corrective action for offsetting decrease in headwind during landing approach, said instrument comprising means having an output which varies as a function of the indicated air speed of an airplane, and means to modify said output as a function of the forward acceleration of the airplane, said last-named means including means to substantially curtail the output of said last-named means which corresponds to a positive forward inertial acceleration.

4. An airplane instrument for furnishing a director signal to indicate or control corrective action for offsetting decrease in head wind during landing approach, said instrument comprising means having an output which varies as a function of the indicated air speed of an airplane, and means to modify said output as a function of the forward inertial acceleration of an airplane, said last-named means including means to substantially block the positive sense of a forward inertial acceleration signal.

5. An airplane instrument for furnishing a director signal to indicate or control corrective action for offsetting decrease in head wind during landing approach, said instrument comprising means having an output which varies as a function of the indicated air speed of an airplane, and means to modify said output as a function of the negative sense only of the forward inertial acceleration of the airplane.

6. An airplane instrument for furnishing a director signal to indicate or control corrective action for offsetting decrease in head wind during landing approach, said instrument comprising means having an output which varies as a function of the indicated air speed of an airplane, means having an output which varies as a function of the forward inertial deceleration of the airplane to the substantial exclusion of positive forward acceleration, and means combining said outputs to provide a director signal.

7. An airplane instrument as set forth in claim 6 wherein all of the outputs are electrical and wherein the combining means is electrical.

8. An airplane instrument as set forth in claim 6 which further includes a utilization mechanism controlled by the director signal.

9. An airplane instrument as set forth in claim 6 wherein all of the outputs and the combining means are electrical and wherein a rectifier is connected across the output of the second-named means in a sense to provide a low impedance path across said output when the output of said means corresponds to positive forward inertial acceleration and to provide a high impedance path across said output when the output of said means corresponds to negative forward inertial acceleration.

10. An airplane instrument for furnishing a director signal to indicate or control corrective action for offsetting decrease in head wind during landing approach, said instrument comprising means having an output which varies as a function of the lift of an airplane, and means to modify said output as a function of the forward inertial deceleration of the airplane to the substantial exclusion of positive forward inertial acceleration.

References Cited by the Examiner

UNITED STATES PATENTS

| | | | |
|---|---|---|---|
| 1,624,219 | 4/1927 | Cowdrey | 73—514 X |
| 2,538,303 | 1/1951 | Findley | 73—178 |
| 3,043,540 | 7/1962 | Greene | 244—77 |

LOUIS R. PRINCE, *Primary Examiner.*

DONALD O. WOODIEL, *Assistant Examiner.*